Sept. 19, 1967  H. R. HULL  3,342,666

CELLULAR HONEYCOMB PRODUCT AND METHOD

Filed Sept. 18, 1963

INVENTOR.
HAROLD R. HULL
BY
Townsend and Townsend
ATTORNEYS

United States Patent Office 3,342,666
Patented Sept. 19, 1967

3,342,666
CELLULAR HONEYCOMB PRODUCT AND
METHOD
Harold Robert Hull, San Leandro, Calif., assignor to
Hexcel Products Inc., Berkeley, Calif.
Filed Sept. 18, 1963, Ser. No. 309,725
10 Claims. (Cl. 161—135)

This invention generally relates to a new and improved cellular honeycomb type structure and method of making same.

Conventional honeycomb packs are usually made by laminating a stack of flat ribbons together at staggered bond or node points. Then when the pack is expanded the adjacent ribbons tend to separate except at the bonded nodes. This results in a plurality of hollow cells forming throughout the body of the expanded pack. Normally, a phenomenon occurs during this expansion which results in the central-most ribbons pursing inward in the ribbon direction to form a somewhat hourglass shaped expanded honeycomb pack.

It has been discovered that precorrugating the ribbons, then nesting the corrugations within one another and bonding them will substantially reduce this pursing effect when expanding the pack. Precorrugation, however, has its problems in that the ribbon thickness causes slight dimensional mis-match at the interface between nested corrugations. In other words, the dimensions on the protruding surface of the corrugation are greater than the dimension on the recess surface by an amount equal to the thickness of the ribbon. Thus when identical corrugations are nested within one another, mis-match occurs which results in the node area between the slanting sidewalls being displaced vertically from one another. In other words, the only contact which occurs between adjacent ribbons will be at the slanting sidewalls.

In order to overcome this type of mismatch when bonding adjacent ribbons together, it becomes necessary to deform the ribbons at the node point to bring them into substantial contact with one another. Although this solution can be applied to packs having few ribbons or very thin ribbons, problems can arise where the pack size is substantial or the ribbon's thickness is increased. Another possible solution to the problem would be to use thick adhesive layers; but this could result in structural weaknesses in that the bonding adhesive could not withstand the structural stresses and strains of use.

An object of this invention is to overcome this mismatch problem by corrugating a plurality of ribbons each with alternate short and tall corrugations in which the protruding surface of the tall corrugations is formed and shaped to be freely received by the recess surface of the short corrugations as ribbons are stacked so that no mismatch or gap occurs between the nodes of nested corrugations or so that any undesired mismatch that does occur is at the slanting sidewalls and not at the node area.

Still another object of this invention is to provide an improved pack of expandable honeycomb which includes the above-defined ribbons and in which the adjacent ribbons are bonded at one portion of the interface of at least every other nested corrugation. An advantage of this bonding sequence resides in the fact that the pack expands into an open cellular structure which can be contoured over curved or irregular surfaces without substantial anticlastic curvature occurring—this phenomenon being discussed in prior United States Patent No. 2,668,327.

An advantage of this alternate short and tall corrugation construction resides in the fact that an adhesive can be readily applied to the apexes of every other corrugation by merely setting an adhesive applicator to a height which will contact the apexes of the tall corrugations and will pass over the apex of the short corrugations with clearance as the applicator and corrugated ribbon are moved relative to one another.

Yet another object of this invention is to provide a means for precorrugating honeycomb ribbons with a die having teeth alternating between a tall and a short relative size.

A more specific object of this invention is to provide an expandable pack of multi-cellular honeycomb type material capable of providing the above advantages and which pack is laminated of a plurality of stacked, corrugated ribbons in which individual corrugations are alternately tall and short and in which the protruding surface of each tall corrugation is dimensioned and shaped to be freely received by the recess surface of the short corrugations in the adjacent stacked layer. Each ribbon in this stack is bonded (as by adhesive, welding, soldering, brazing, or the like) to each of the adjacent ribbons at the nesting interface of certain ones of the nested corrugations wherein the pack can be expanded into an open cellular structure comprising a plurality of hollow cells, each defined by multiangular walled portions formed by the expanded ribbons.

Other objects and advantages of this invention will become apparent upon reading the following detailed description and referring to the accompanying drawings in which.

Figure 1:
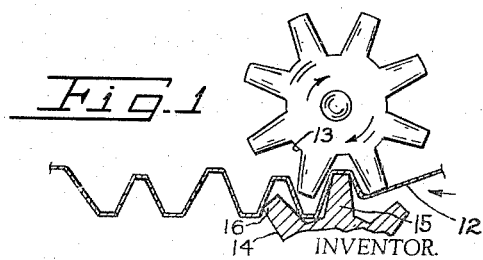
FIG. 1 shows a fragmentary view of a die forming process for corrugating the ribbons.

Referring to FIG. 1, a substantially flat piece of ribbon 12 is precorrugated by first running it through a pair of roller die corrugating wheels 13 and 14 wherein the ductile material is bent into a corrugated, substantially truncated triangular form. In one of the roller dies 13 all of the teeth are the same size. The teeth on the second roller die 14 alternate between tall teeth 15 and short teeth 16. This arrangement has been found to be especially suited for the alternate short and tall corrugation sequence. Conventional metal shears can be stationed on either side of the die and timed to cut the ribbon into predetermined lengths. The end result is a plurality of equal length ribbons or sheets. Of course, it should be understood that other corrugating methods can be used such as stamping or cutting from a solid block.

Figure 2:
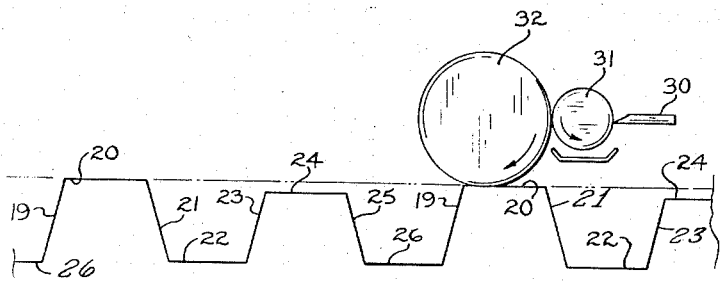
FIG. 2 is an enlarged fragmentary view of one pre-corrugated ribbon including an adhesive applicator.

Referring now to the details of the ribbons, the individual corrugations alternate between two different sizes. That is, the individual corrugations alternate between a first relatively taller corrugation and a second relatively shorter corrugation and which for sake of convenience will be referred to hereinafter simply as "tall" and "short" corrugations. From FIG. 2 it can be seen that the floors 22 and 26 between individual corrugations are all aligned in substantially coplanar relationship. The apexes which will hereinafter be referred to as tables 20 and 24, however, are alternately aligned in relatively higher and lower planes. Thus the corrugations can be thought of as being similar except that the short ones are cropped. Explained in different terminology, the slope of the side walls and the width dimensions of the corrugations are the same in the same plane and the only difference is that alternate ones of the corrugations are cropped to shorten them.

Starting with the first tall corrugation on the left, the table 20 is formed between the two downwardly extending, diverging or sloping side walls 19 and 21. The adjacent short corrugation includes an interconnected flat table 24 and two downwardly extending, diverging side walls 23 and 25. Interconnecting this short corrugation with the two adjacent tall corrugations are the flat floor portions 22, 26 extending between the bases of the sloping side walls. The sloping side wall 23 and 25 of the short corrugation are ideally formed at substantially the same angle as the sloping side walls 19 and 21 of the tall corrugation but are shorter. The short corrugation's table 24 is, however, wider than table 20 of the tall corrugation since the corrugation has been cropped at a wider body portion. In sizing this table 24, it should be of sufficient width that the recess surface of the short corrugation table is dimensioned no smaller than the protruding surface of the tall corrugations table. This permits the tall corrugations of adjacent ribbons, when stacked, to be freely nested within the short corrugations without creating a gap or space between stacked tables at the adjacent ribbon interfaces as will be explained shortly, and as a result, any undesired gap which does occur is along the sloping side walls.

Since the pattern of alternate tall and short corrugations is continued throughout the entire length of ribbon 12 there is no need to go into further detail and explain the shapes and sizes of the adjacent corrugations.

Figure 3:
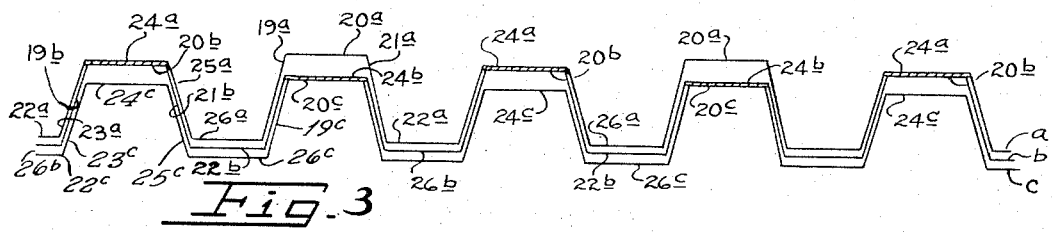
FIG. 3 is an enlarged fragmentary view showing a plurality of stacked and bonded ribbons in the unexpanded form.

Just prior to stacking the plurality of ribbons as shown in FIG. 3, an adhesive material can be applied at selected node points. One possible way of applying this adhesive would be by an applicator 30 in which a predetermined amount of adhesive material is applied to the distributing roller 31 and subsequently transferred to the applicator roller 32 as they rotate simultaneously. The adhesive on applicator roller 32 is thereafter transferred to the flat table of only the tall corrugations as the ribbons travel relative the roller. The present invention particularly lends itself to the adhesive bonding of every other node point simply because an adhesive applicating roller that is mounted in fixed position above a table surface along which the corrugated ribbon is conveyed will contact and apply adhesive to only the tall corrugations. Thus, no special precautions have to be taken in reference to preventing adhesive from being applied to the intermediate short corrugations which will simply pass under the applicator without contacting same. Of course it should be understood that this method is not especially suitable in instances where the height differential between corrugations is but slight. In these instances, it may be more desirable to use a star-wheel applicator which selectively applies the adhesive to the nodes.

In special instances it should be understood that the adhesive application can, within the skill of the art, be adjusted or made to operate so that other evenly spaced node patterns could be used. One such node pattern would be every sixth tall corrugation. The only limitation in this instance is that the pattern be maintained consistent throughout the pack.

Further, the use of an adhesive applicator is only representative of the many different types of bonding processes which could be used. As used herein and in the claims, the term "bonding" may include mechanical attachments, welding, brazing, soldering, and riveting as examples of how the nodes of the corrugated ribbons can be affixed or attached together.

Now referring to the stacked, bonded ribbons of FIG. 3, it can be seen that the tall corrugations are nested within the short corrugations, and vice versa. In describing the details of this stacked configuration, it should be noted that each of the ribbon layers is identified by the reference character a, b and c. In order to clearly identify the identical portions of the ribbon each identical portion will be given the same reference numerals as in FIG. 2; however, the identical part in each layer will be identified by the suffix a, b or c for that ribbon layer. In upper layer a, the tall corrugations are defined by the two sloping side walls 19a and 21a and the flat table portion 20a. The short corrugations, in turn, are defined by the two short sloping side walls 23a and 25a and the wide, flat table 24a extending between their top. The flat floor portions extending between the alternate tall and short corrugations are identified as 22a and 26a.

For sake of simplicity and clarity of disclosure as to FIGS. 2, 3, 4 and 6 the ribbon material comprising each layer is shown schematically in single line thickness. In FIGS. 1 and 5 the thickness of the ribbon or web material is shown in double line representation.

In the middle layer b, the short corrugations are nested within the tall corrugations and the tall corrugations are in turn nested within the short corrugations of upper ribbon a. Referring first to the tall corrugations of layer b nested within the short corrugations of layer a, it is seen that the protruding surface of the tall corrugations is dimensioned and shaped such that the flat table portion 20b and the diverging side walls 19b and 21b freely fit within the recess surface of the short corrugations defined by the table 24a and the diverging side walls 23a and 25a. Since nested legs 19b and 21b are longer than the nesting leg 23a and 25a, the flat floor portions 22a and 26b are displaced vertically from one another a distance about equal to the height differential between the tall and the short corrugations. In addition, those short corrugations of layer b nested within the upper ribbon's tall corrugations are also displaced vertically by this same amount. As previously stated, the reason for making the tables 24 of short corrugations wider is so that they will freely receive the table 20 of tall corrugations without creating a gap at the node point. Thus, any nesting problem created by cropping the corrugations is substantially eliminated by vertically displacing the short corrugations to the wider portion of the tall corrugations when nested.

If, instead, all of the corrugations were substantially the same size, a slight mis-match in dimension would occur between stacked corrugations because of the decrease in dimension between the protruding and recess corrugation surfaces due to the thickness of the ribbon. As illustrated in FIG. 5, the table of nested corrugation 40 is spaced slightly from the table of nesting corrugation 50. Although this slight gap would not be serious with just a few ribbon layers, it would be cumulative in effect and would eventually increase the pack thickness greatly. In addition, thicker ribbons would have a substantially greater gap effect and it would be impractical to use them in large packs. There would also be the structural problems of any thick layers of bonding material or in deforming the ribbon layers to bring the node points into contact.

Referring back to FIG. 3, the bonding node of nested corrugations is selected as the interface between the protruding surface of the nested tall corrugations and the recess surface of the nesting short corrugation. As illustrated this bonding node point is at the interface between the protruding surface of tables 20 and the recess surface of tables 24. The adjacent short corrugations, which are nested in the upper tall corrugations, do not contact or abut the recess surface of these upper tall corrugations at the table and therefore cannot be selected as bonding nodes. This sequence of bonding at the interface of only the tall corrugation nested within the short corrugation is continued throughout the entire ribbon stack.

Figure 6:
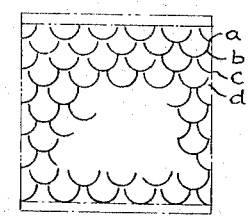
FIG. 6 is a front elevational view of an expanded pack of honeycomb.
Figure 4:
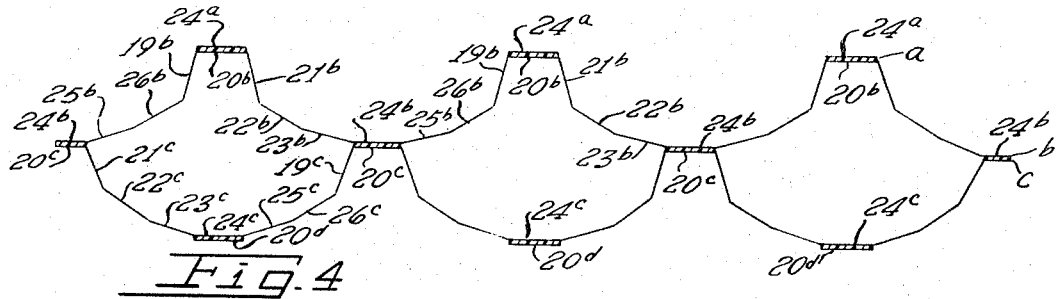
FIG. 4 is an enlarged fragmentary view showing the bonded pack of ribbon in expanded form.
Figure 5:
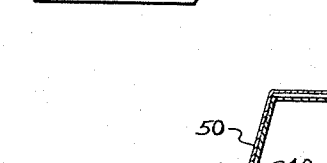
FIG. 5 illustrates an enlarged fragmentary cross sectional view showing the mismatch which can occur in stacked corrugation.

As a result of this selective bonding, a laminated stack of corrugated ribbons is manufactured which can be expanded into the open cell configuration of FIG. 4 and FIG. 6. When vertically directed forces are applied to the upper and lower ribbons of the pack, the adjacent ribbons separate except at the bonded node points, and the corrugated or bent portions or ribbon hinge and bend to form the plurality of substantially congruent hollow cells. In addition, it has been discovered that it is now possible to use much thicker ribbons than would be possible with the typical flat ribbon pack. A possible reason for this is that bending and flexing of the metal is enhanced or most likely to occur at or along the corrugation creases. Thus, the crease points act as somewhat of a hinge point as the corrugation walls articulate during expansion. The end result is the 14-sided, hollow cells of FIG. 4.

An advantage of having the creases in the cell wall portion between the four bond points or corners is that the expanded pack can be easily contoured to an irregular or curved surface without substantial anticlastic curvature occurring. The creases caused from corrugating the ribbons seem to divide the cell walls into a plurality of relatively flat planes. As a result, any flexure or bending which occurs within the ribbon material as the expanded pack is placed over a contoured surface, is most likely to happen in these relatively flat planes. Since the theory of the stresses and forces which set up this flexing are complex and difficult to explain they will not be further discussed.

With other bonding patterns, such as the previously discussed wider separation between nodes, the resultant expanded cell configuration will be made up of a many more sided cell. As a result there would be an even greater tendency for the pack to be formable since there would be more flex planes.

If other corrugation shapes, such as more rounded, or more V-shaped, were to be used, the above discussed size criteria are still effective. That is, the individual corrugation should alternate between a short and a tall amplitude. In addition, it is ideally preferable to form the size, angles, shapes and dimensions of the tall corrugations protruding surface and the same shape and dimensions as the recess surface of the short corrugations in which it will nest. This would result in the greatest space saving. Of course, it should be understood that the dimensions of the tall corrugations can be made less than the dimensions of the recess surface of the short corrugations. The only limitation on this is that the lower portion of the recess surface of the tall corrugations should be sufficiently wide to receive that portion of the short corrugation which is nested within it when the ribbons are stacked.

In summary, the various steps set forth hereinabove of one embodiment of the novel method for producing the new product of my invention may be described as follows: (1) corrugating a flat ribbon of ductile material to form alternate short and tall corrugations having recess and protruding surfaces; (2) cutting the corrugated ribbon at selected intervals to form a plurality of shorter ribbons; (3) applying adhesive material to the protruding node surfaces of the tall corrugations of the several ribbons; (4) stacking the adhesive applied ribbons so that the tall corrugations are nested within the short corrugations and vice versa; (5) bonding, by means of the applied adhesive, the interfaces of the tall corrugations nested within the short corrugations to form a laminated stack of corrugated ribbons of desired depth; (6) expanding the laminated stack to form a polyangular configuration open cell honeycomb material.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for making expandable honeycomb from sheet material including the steps of: providing a plurality of ribbons of sheet material; corrugating said ribbons of material with alternate tall and short corrugations, each having relatively diverging side walls along at least a portion thereof; superposing the corrugated ribbons one on top of the other with the tall and short corrugations of adjacent superposed ribbons nested within one another respectively; and bonding the interface between the apex of every other tall nested corrugation to the apex of the respective nesting short corrugations in the adjacent ribbon whereby the plurality of corrugated ribbons are adapted to be expanded from the nested corrugation relationship to form a structure having plurality of hollow honeycomb cells.

2. The method for making honeycomb of claim 1 in which the step of bonding the adjacent ribbons includes: applying an adhesive material to only the apex of every tall corrugation; and bringing the apex of the superposed short corrugations into intimate contact with the adhesive material.

3. The method of making honeycomb of claim 1 in which said step of corrugating said ribbons includes: forming the short corrugations to have a recess surface width dimensioned at least as great as the protruding surface width of the nested tall corrugations at the upper portions thereof.

4. The method of making honeycomb of claim 3 in which the step of forming the corrugations includes contouring the recess surface of the short corrugations to substantially the same contour of the protruding surface of the tall corrugations wherein said tall corrugations are adapted to snugly nest in said short corrugations.

5. A method for making a pack of expandable honeycomb comprising: providing a plurality of sections of sheet material; corrugating said material with alternate tall and short corrugations in which the protruding surfaces of the tall corrugations are dimensioned width-wise appreciably less than the recess surfaces width-wise of the short corrugations; superposing said sections to nest the protruding surface of the tall corrugations with the recess surface of the short corrugations on each adjacent superposed section; bonding at least every other nested tall and short corrugation at an interface adjacent the apex of the tall corrugation whereby transversely expanding the bonded sections from corrugation nested relationship causes the sections to bend into a plurality of polyangular hollow honeycomb cells.

6. A laminated structure comprising: a plurality of superposed sections of sheet material, each section being formed with a plurality of alternating short and tall corrugations; each tall and short corrugation being nested within the short and tall corrugations respectively of the adjacent sheets, and bonding means operably connecting the interfaces between the protruding surface of selected evenly spaced tall corrugation to the recess surface of the nested adjacent short corrugation whereby the sections of sheet material are exapndable to form an open cellular honeycomb structure.

7. The laminated structure of claim 6 in which the recess surface of the short corrugations is dimensioned to freely receive the protruding surface of a tall corrugation in nested relationship wherein no appreciable deformation occurs at the interface of the sheet material.

8. The laminated structure of claim 7 in which the width-wise dimension at the protruding surface of the tall corrugation is appreciably less than the width-wise dimension at the recess surface of the tall corrugation.

9. A method for making an expandable pack of honeycomb comprising: providing a plurality of ribbons of sheet material; corrugating each said ribbon of said material with alternate tall and short corrugations, in which the recess surface of the short corrugation is dimensioned to freely receive the protruding surface of a nested tall corrugation; stacking said plurality of corrugated ribbons with the protruding surface of the tall corrugations nested within the recess surface of the short corrugation in each adjacent ribbon; bonding said adjacent ribbons together at the interface between nested corrugations whereby expansion of said pack operably separates said adjacent ribbons except at the bond points to form a plurality of hollow cells.

10. The method of claim 9 in which the step of corrugating includes running the ribbon through die in which the alternate teeth on only one die are cropped to form said alternate tall and short corrugations.

References Cited

UNITED STATES PATENTS

| | | | |
|---|---|---|---|
| 2,190,490 | 2/1940 | Sendzimir | 29—455 |
| 2,848,132 | 8/1958 | Davous | 156—197 X |
| 3,086,624 | 4/1963 | Wyatt | 156—205 X |
| 3,086,899 | 4/1963 | Smith et al. | 161—127 |

FOREIGN PATENTS

| | | |
|---|---|---|
| 525,128 | 5/1956 | Canada. |

ALEXANDER WYMAN, *Primary Examiner.*

MORRIS SUSSMAN, EARL M. BERGERT,
*Examiners.*